March 11, 1969    B. H. SHINN ET AL    3,432,587
PROCESS FOR PREPARING POLYTETRAFLUOROETHYLENE GASKETS
Filed May 6, 1966

INVENTORS
BYRON H. SHINN
HERBERT E. TODD

BY *Finnegan & Henderson*

ATTORNEYS 3,432,587
**PROCESS FOR PREPARING POLYTETRA-
FLUOROETHYLENE GASKETS**
Byron H. Shinn, Bolton, and Herbert E. Todd, West Hartford, Conn., assignors to United Aircraft Corporation, East Hartford, Conn., a corporation of Delaware
Filed May 6, 1966, Ser. No. 548,189
U.S. Cl. 264—120                                    7 Claims
Int. Cl. B27j 5/00

ABSTRACT OF THE DISCLOSURE

A process is provided for forming polytetrafluoroethylene (PTFE) filaments into a desired gasket shape through a procedure affording uniform fiber orientation, with the longest dimension of the linear PTFE polymer chain being presented at the gasket surface through the entire periphery of the gasket. For example, the PTFE filaments may be wound on a mold under tension. The filaments are then compacted in the mold into a desired gasket shape, sintered to bond the filaments into a monolithic gasket unit, and cooled at a predetermined rate to produce the desired degree of crystallinity in the final gasket product.

---

Figure 1:
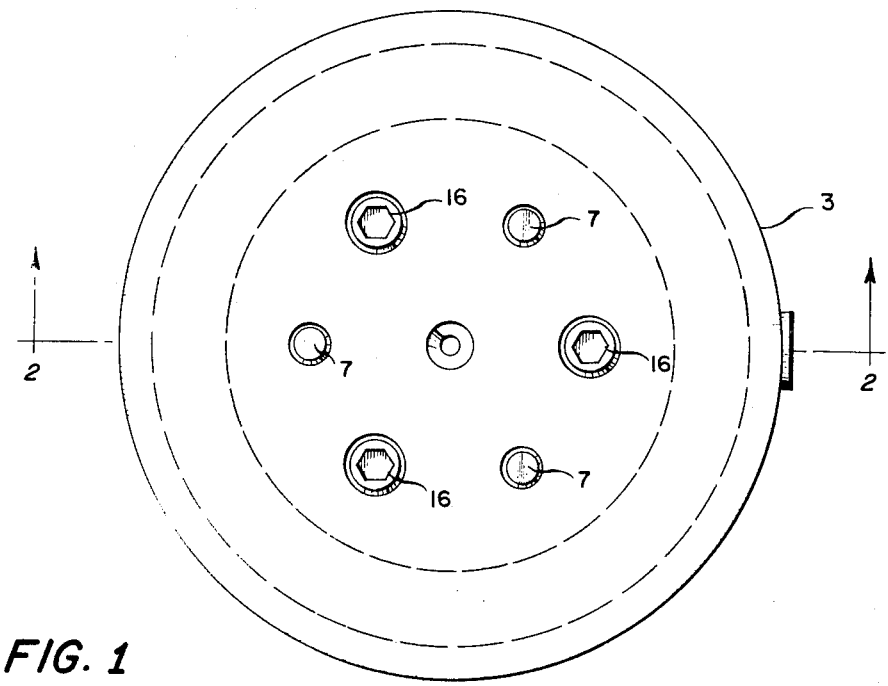

This invention relates to polytetrafluoroethylene (PTFE) gaskets. More particularly it relates to a process of preparing a process for producing gaskets from filaments of PTFE, and to the resulting gasket products.

It will be understood that the term "gasket" as used in this specification and the appended claims is intended to include any gasket, O-ring or seal. Such seals or gaskets can be round, elliptical, rectangular, square, or of any other desired shape.

In the past PTFE gaskets generally have been produced from skived sheets cut from billets of PTFE. This method has not proved satisfactory because it does not produce uniform products. The crystallinity and grain of the PTFE in the billets, and hence in the skived sheets, varies widely across the individual sheets and from one sheet to another. This variation in crystallinity results in a corresponding variation in the density and resiliency or flexibility of the PTFE across the sheets, which along with the grain variation result in the production of undesirably nonuniform PTFE gaskets from such skived sheets.

A further disadvantage of PTFE gaskets produced from skived sheets is that such sheets have "memory." Thus, when gaskets made by this process are heated to elevated temperatures, for example to about 500° F., the stresses imposed during skiving and subsequent mechanical operations at lower temperatures, such as at room temperature, are relieved, and the PTFE tends to return to the original, unstressed form of the PTFE billet. This produces undesirable distortion in PTFE gaskets made by skived-sheet processes.

Because of these shortcomings in gaskets made by the skived-sheet processes, PTFE gaskets have more recently been produced by molding from PTFE powder. These powder-molding processes produce gaskets definitely superior to those made from skived sheets; however, they also have shortcomings. It is extremely difficult to distribute and pack PTFE powder uniformly in a mold, and this is particularly true where the mold has a complex shape. This inability to achieve uniformity in the distribution of the powder in the mold results in the production of gaskets of nonuniform density.

PTFE does not have a true melting point, and generally it begins to decompose on heating by the time it reaches its designated melting point of 722° F. For this reason PTFE cannot be uniformly distributed in a mold by heat flowing techniques, and to produce a uniform product, it is necessary to initially insert the PTFE in the mold uniformly. As pointed out above, this is extremely difficult to accomplish with PTFE powder.

Another shortcoming of the prior art PTFE gaskets produced by both skived-sheet processes and powder molding processes is that such gaskets generally exhibit undue amounts of creep at elevated temperatures. This lack of suitable creep resistance is particularly troublesome at use temperatures of about 400° F. or greater. Satisfactory gaskets for such elevated temperature usages can be produced by these prior art processes only if the gaskets are subjected to extensive machining and processing after their production. This requirement for post-production processing substantially increases the cost of making gaskets for high temperature usages by the skived-sheet and powder-molding processes.

It has also been found that powder-molded PTFE gaskets generally exhibit a lack of dimensional stability, even at room temperature, and distort in various ways during storage and before use.

Accordingly, and in order to overcome the foregoing disadvantages of prior art PTFE gaskets, it is a primary object of the present invention to provide a process for producing a gasket made of PTFE which has uniform density, good dimensional stability, superior structural uniformity and creep resistance, and good corrosion resistance.

Another object of this invention is to provide a process for producing improved PTFE gaskets having the foregoing properties, which can be produced at low cost, and by a process which readily lends itself to automation.

A further object of this invention is to provide an improved process for the production of PTFE gaskets from filaments of PTFE.

A still further object of this invention is to provide an improved process for the production of PTFE gaskets that produces gaskets having good creep resistance, dimensional stability, and structural uniformity without post-production working. While the gaskets of this invention can be subjected to post-production working, which provides even further enhancement of the beneficial properties derived from this invention, such working is not necessary for production of the superior gaskets of this invention.

Yet another object of this invention is to provide a process for producing PTFE gaskets that have substantially improved performance properties at elevated temperatures of about 400° F. or higher.

Additional objects and advantages of this invention will be set forth in part in the description that follows, and in part will be obvious from the description, or may be learned by practice of the invention, the objects and advantages being realized and attained by means of the methods and processes particularly pointed out in the appended claims.

To achieve the foregoing objects and in accordance with its purposes, this invention provides a process for producing PTFE gaskets characterized by uniform density, good dimensional stability, corrosion resistance and structural uniformity, and low creep. This process comprises forming a multiplicity of PTFE filaments into a desired gasket shape and sintering the filaments at an elevated temperature to bond them into a monolithic gasket unit having the desired shape.

The process of this invention results in the production of PTFE gaskets having substantially uniform fiber orientation. The fibers of the gasket are so oriented that the longest dimension of the linear PTFE polymer chain is presented at the gasket surface throughout the entire periphery of the gasket.

Figure 2:
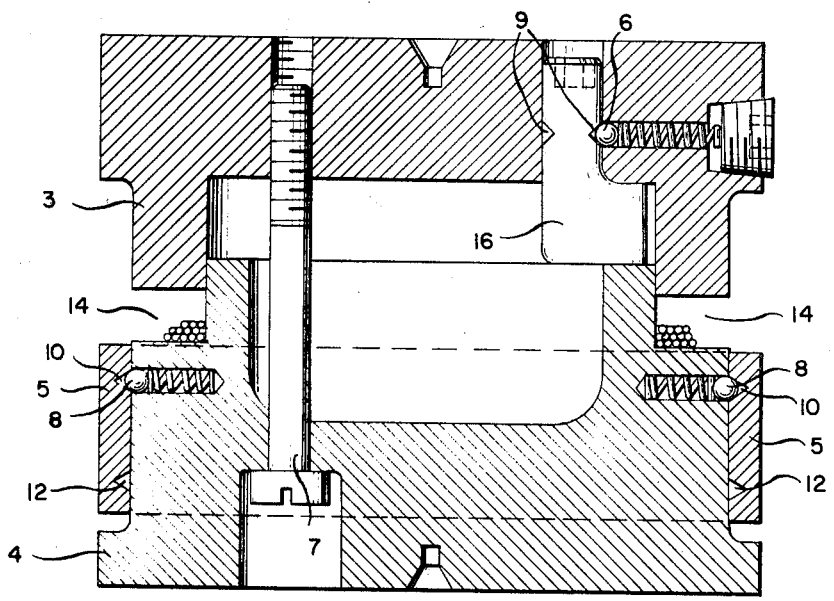

In the drawings:

FIG. 1 is a top view of a preferred embodiment of a complete mold used for the production of the PTFE gaskets of this invention; and FIG. 2 is a central vertical section taken along line 2—2 of FIG. 1.

In a preferred embodiment, the process of this invention comprises winding PTFE filaments on a mold under tension; compacting the filaments in the mold into a desired gasket shape; sintering the filaments in the mold at elevated temperatures and pressures to bond the filaments into a monolithic gasket unit; and cooling the gasket at a predetermined rate to produce the desired degree of crystallinity in the final gasket product. As a final optional step the gasket product can be subjected to post-production working at elevated temperatures and pressures to further enhance the beneficial properties of the resulting product.

The PTFE filaments used in producing the gaskets of this invention are available commercially in the form of bundles or yarns of filaments on rolls or bobbins. Each filament has a diameter of about 0.8 mil, and there are generally about 180 filaments to a bundle. The yarn or bundle of filaments has not been twisted, and thus the filaments are not basically in a twisted or cross-over relationship to each other.

The PTFE filaments used in making the gaskets of this invention are produced by extrusion. The extruded grade of PTFE used in making these filaments generally has a much smaller grain size than that of by PTFE molding powders.

Exemplary of a yarn of PTFE filaments suitable for use in accordance with this invention is a 1350 denier yarn. (Denier is a measurement of the grams of material per 9000 meters of yarn.) The diameter of the individual filaments used in the process of this invention can vary, but as larger filament diameters are used more problems occur in the compacting step because of the larger intermediate spaces between the filaments which must be filled during compacting.

Generally the PTFE filaments are partially sintered before being formed into the desired gasket shape to remove the lubricant normally used in the extrusion of the filaments. The filaments, however, are not heated to the transition range of PTFE (the temperature range at which it becomes completely amorphous) during this preliminary sintering step.

In a preferred form of this invention the PTFE filaments, in the form of the above-described yarn or bundles, are wound directly off the bobbin or roll into a mold, under tension.

The mold can be of any desired configuration, so long as the completely assembled mold cavity is of the correct size and shape for the production of the desired gasket.

The bundles or yarn of PTFE filaments should be wound into the mold under regulated tension. Enough tension should be used to make the filaments lay properly in the mold to produce a uniform product. If too much tension is used in winding the filaments into the mold, the filaments may be stretched, with a consequent reduction in their cross-section and the production of a non-uniform product. The use of too much tension can also introduce undesired stresses into the filaments. These stresses can cause subsequent problems due to the memory of PTFE. Generally, it is preferred to wind the PTFE filaments while they are under about 20 to 70 grams of tension, however, the use of these amounts of tension is not critical to the successful practice of this invention and tensions outside this range can also be satifactorily used if they meet the above requirements.

As an alternative procedure to that described above, it is also possible to wind the extruded PTFE filaments directly into the mold from the extruder. Thus, a producer who is extruding PTFE filaments could wind the filaments into a suitable mold directly from the extrusion process, under tension of the type described above.

It is not necessary that the filaments be wound directly into the mold to satisfy the requirements of the process of this invention. The filaments can be first preformed into a desired shape, and thereafter inserted into a mold for sintering and bonding into a monolithic unit. However, it is much easier to wind the filaments directly into the mold, and therefore this procedure is preferred in the process of this invention.

The filaments are wound into the mold in a uniform manner so that they lay in a substantially parallel relationship to each other. This results in the creation of a product having uniform density, and also results in proper fiber orientation of the PTFE so that the longest dimension of the linear polymer chain, which is most stable chemically, is presented at the surface of the resulting gasket throughout its entire periphery. This presentation of the stable dimension of the polymer chain, rather than the more chemically unstable chain ends, at the gasket surface is believed to account at least in part for the good corrosion resistance of gaskets produced in accordance with this invention.

The filaments are wound into the mold until a desired accumulation is achieved. This accumulation should be sufficient to produce a gasket of the desired size.

In accordance with a preferred form of this invention, after the desired accumulation of PTFE filaments has been wound into the mold, the mold is closed and a ring is placed around the mold cavity to completely close it in all directions and prevent radial flow of the PTFE in the mold. Pressure is then applied to compact the PTFE in the mold and thereby reduce the interstices between the filaments. Most preferably sufficient pressure is applied to achieve the highest density obtainable, which is about 98% of the theoretical density of solid PTFE. For some usages, compacting the filaments to a density of at least about 80% of the theoretical density of solid PTFE is sufficient, however, compacting to a density of at least about 90% of theoretical is preferred. Optimum filament density is about 96–98% of the theoretical density of solid PTFE. Any suitable pressure can be used for this preform or compacting step. About 300 to 1000 p.s.i. is generally suitable for achieving the desired compacting.

As pointed out above, in a suitable alternative procedure the PTFE filaments can be preformed or compacted before being inserted into the mold in which they are to be molded and sintered into the desired gasket shape. However, preforming after initial winding into the mold is a simpler procedure.

After the PTFE filaments have been compacted to the desired density, they are sintered at an elevated temperature and pressure to bond them into a monolithic unit. This sintering step comprises heating the mold containing the compacted filaments to a temperature of at least about 575° F. This heating can be carried out by any convenient means, for example, in an oven, by induction heating, by an electrostatic field, or by any other suitable means.

The heating can be carried out while the compacted PTFE is under pressure, or the compacted filaments can be heated and then further compressed after the sintering temperature is reached. The pressure imposed on the PTFE filaments during sintering should be at least about 5 p.s.i. Any suitable pressure greater than this can, of course, be used. Exemplary of preferred pressures which can be used in the sintering step are pressures of about 1100 to 1200 p.s.i. Optimum sintering temperatures and pressures will, of course, vary for each particular type and size of gasket being produced. Sintering temperatures as high as 800° F. may be suitable in certain instances, although the temperatures used will generally be less than this, and temperatures between about 625° F. and 650° F. are preferred.

The compacted PTFE filaments are held at the sintering temperature and pressure for a period of time sufficient to insure that all the material reaches the desired temperature. This results in the individual filaments being bonded into a monolithic body. The preferred sintering time varies with the thickness of the gasket being produced, but generally sintering times of from about 5 minutes to about 2 hours or longer can be used. The preferred sintering time will also vary with the particular sintering temperature and pressure selected. Generally, however, sintering times of less than 5 minutes do not produce a complete bond between the filaments, and thus do not result in the production of a monolithic gasket unit; and sintering times in excess of 2 hours achieve no additional benefit, since complete bonding normally occurs within that time.

At the optimum sintering temperatures and pressures set forth above, i.e., 625–650° F. at 1100–1200 p.s.i., sintering times of about 20 to 30 minutes are beneficially used.

After the sintering step has been completed, the mold with the enclosed sintered PTFE product is cooled. This cooling step is important in the instant process because the rate of cooling controls the level of crystallinity in the resulting product, and hence its density and other physical properties, such as its flexibility and resiliency.

The critical portion of the cooling step, in controlling the crystallinity of the product, is the rate of cooling through the second order transition point of the PTFE, or down to a temperature of about 550° F. A rapid cooling rate down to this temperature produces a product of low crystallinity, while a slow cooling rate down to this temperature produces high levels of crystallinity in the product.

When a temperature of about 550° F. is reached, the crystallinity of the product is determined, and the further rate of cooling is unimportant, except that it should not be so rapid as to produce distortion or damage to the product. It will be apparent from the above description that if a highly crystalline product is desired, longer cooling times are used. In such situations, cooling times (i.e., the time used to reduce the temperature of the product to about 550° F.) of about 2 hours or more can be used.

Generally, cooling times on the order of about 1 to 15 minutes are preferred. Again, "cooling time" refers to the time used to reduce the temperature of the product to about 550° F.

It will be appreciated that the cooling rate will vary with the thickness of the work piece, and the desired degree of crystallinity in the final product. Controlled cooling makes it possible to achieve desired physical and mechanical characteristics in the final product. Extreme cooling rates should be avoided because cooling too rapidly can produce undesirable stresses in the product and may cause product cracking, while cooling at too slow a rate can produce undesirably high levels of crystallinity, resulting in a brittle product.

After the cooling step is completed, the product can be directly trimmed, at both its outer and inner diameters, to remove flash and produce the final PTFE gasket. Such trimming is generally carried out by a conventional dye trimming procedure.

In a most preferred form, however, the gasket product from the cooling step is subjected to a "post-production" working or treatment step. This step is sometimes referred to as "pre-stress" because it imparts stresses to the product prior to its actual use. However, this treatment step is carried out after the complete production of the gaskes of this invention, and accordingly, in this instance, it is more clearly denominated the "post-production" working step.

This post-production working step, in fact, constitutes a coining or reforming operation, designed to impart even further enhanced dimensional stability and creep resistance to the gaskets of this invention. These enhanced properties resulting from post-production working are most apparent at highly elevated temperatures.

The post-production treatment contemplated by this invention is conventional to PTFE gaskets made by powder-molding techniques, and involves the application of pressure to the product at elevated temperatures. In this post-production working, the PTFE gasket can be completely confined, in which case the step would properly be termed "coining," or it can be confined in only one direction, such as between two flat plates, in which case there will be a slight flow of the product in the other direction, i.e., radially.

The elevated temperatures used in the post-production working step are below the second order transition range of PTFE, which is about 575° F. to 622° F. (The precise transition point is generally reported in the literature as 621–622° F., but the effect of cooling on crystallinity is apparent down to about 575° F. As pointed out above, to be on the safe side the cooling times of this invention are calculated on the time required to cool the product down to about 550° F.) If temperatures above this second order transition range are used in post-production working, the desired degree of crystallinity in the product, which has been achieved in the cooling step, may be altered.

The amount of pressure applied to the gasket during post-production working is preferably greater than the anticipated loads to which the gasket will be subjected in actual use.

As a non-limiting example of the type of post-production working which imparts enhanced beneficial results to the gaskets produced by the process of this invention, such a gasket can be subjected to 4000 p.s.i. between flat plates for about 5 hours at a temperature between about 550° F. and 580° F.

As pointed out above, the post-production treatment, which is preferably used in the process of this invention, is conventional to the production of PTFE gaskets by powder-molding techniques. However, post-production process is required for the production by powder-molding processes of gaskets having satisfactory performance characteristics at elevated temperatures above about 400° F. By way of contrast, post-production working is only an optional step in the instant process. Its inclusion does produce advantageous results, and the gaskets produced by the process of this invention with a post-production working step are far superior to those produced by the prior art powder processes that include a substantially similar post-treatment working step; however, the inclusion of such a step is not required in the process of this invention.

Trimming the flash from the I.D. and O.D. of the gaskets of this invention, to produce the final gasket product is deferred until after the post-production working step if such a step is used.

The PTFE gasket resulting from the above-described process has uniform fiber orientation, resulting from the parallel relationship of the PTFE filaments from which the gasket is made. The fibers are so oriented that their longest molecular chain dimension is presented at the gasket surface. The finished seal therefore has the fiber orientation of extruded PTFE throughout its entire periphery, with the longest molecular dimension oriented in a tangential direction, and with a minimum number of polymer ends exposed on the surface of the gasket product.

This structure of the gasket is believed to impart superior corrosion resistance to the gaskets produced in accordance with this invention. It is known that the ends of the PTFE polymer chains are the least stable areas of the polymer chain, chemically. This lower chemical stability at the polymer chain ends occurs because the carbon atoms at the polymer chain ends either have an unsatisfied valence bond not protected by chemical linkage with fluorine, or are attached to other elements by energy bonds of lower energy than a carbon to fluorine (C—F) bond. Thus, the chemical stability of the product is lessened when a random molecular direction of the PTFE molecules is present in the gasket. Such a random directional effect, of course, results from both the prior art powder-molding techniques, and the skived-sheet processes. Both processes require mechanical cutting or finishing of the PTFE, which exposes an even larger number of unstable polymer chain ends due to polymer scission resulting from skiving, grinding, machining and the like.

For a clearer understanding of the invention, specific examples of it are set forth below. These examples are merely illustrative, and are not to be understood as limiting the scope and underlying principles of the invention in any way.

Example 1

The process of this invention, as illustrated by this example, can be more readily understood by reference to the accompanying drawings.

As shown in FIG. 2 the mold comprises a top mold element 3 and a bottom mold element 4 that telescope with each other to provide a mold cavity 14 of any desired thickness. Spacer cams 16 are engaged between top mold element 3 and bottom mold element 4 to hold these elements in the desired relationship with each other. Spacer cams 16 can be rotated 180°, and by this rotation can either engage top mold element 3 and bottom mold element 4, or be retracted and disengaged, depending upon which of the two detent pockets 9 in the spacer cams 16 is engaged by cam detents 6.

Cover ring 5, as shown in FIG. 2, is located around the mold and is attached thereto. When cover ring 5 is in a lowered position as shown, the mold cavity 14 is open at its side to permit initial filling of cavity 14 with the PTFE filaments and the slight radial flow of the PTFE which occurs during post-production working of the material in the mold cavity.

Cover ring 5 is held or secured in the lowered position by engagement of spring-loaded detents 8 with upper detent groove 10. Similarly, when cover ring 5 is in its raised position, it is secured there by engagement of detents 8 in lower detent groove 12.

When cover ring 5 is in its raised position the mold is completely closed. This position permits molding and/or coining of the material in the mold cavity. The position of cover ring 5 is thus controlled by whether detent groove 10 or 12 is engaged by detents 8.

Tie bolts 7 can be positioned to reduce or expand the size of the mold cavity and thus can be used to relieve pressure which has previously been applied to the material in the mold cavity and to hold this material under any desired degree of pressure.

In this example, mold cavity 14 is filled by winding into the mold 1350 denier PTFE yarn obtained from E. I. du Pont de Nemours & Co. (Du Pont 1350–180–0). The winding step is carried out with the filaments under 20 grams of tension and in a parallel layer pattern, until the mold cavity is substantially filled with wound yarn. The size of the mold cavity is set at a predetermined figure which is approximately 160% of finished gasket thickness.

After the winding is complete, cover ring 5 is raised until detents 8 engage the bottom of detent groove 12 of the ring. This closes the mold cavity and completely contains the wound PTFE filaments. Spacer cams 16 are retracted by 180° rotation. The mold assembly is then heated to 250° and loaded axially in an amount equivalent to 1000 p.s.i. on the gasket face area.

The load is applied on the top mold element, and thus a unidirectional squeeze is applied to the product. (A multi-directional squeeze can also be used, if desired, where suitable equipment is available.)

The gasket is held under 1000 p.s.i. of pressure at 250° F. until it has thinned to a predetermined thickness equivalent to 98% of the theoretical density of solid PTFE. In this example, the condition is attained when the gasket reaches a predetermined thickness of about 140% of the desired finished gasket thickness.

When 98% of theoretical density has been achieved, i.e., when the gasket has reached the predetermined thickness, the load is removed from the mold and tie bolts 7 are repositioned to lock the mold at the coined gasket thickness with a pressure of about 5 to 20 p.s.i. on the gasket surface.

The PTFE in the mold is then sintered by raising the temperature slowly to between 625 and 650° F. and holding it at that temperature for 25 minutes. After this period, the mold is water quenched to 550° F. in 2 minutes and then cooled to room temperature by a combination of water quenching and air cooling.

The gasket produced by this process is subjected to post-production working by lowering cover ring 5 until detents 8 engage the upper detent groove 10 of the ring, thereby removing all restraint from the outer diameter of the gasket. The mold is then loaded axially at a temperature of 550 to 580° F. to effect the following pressures on the surface of the gasket:

500 p.s.i. for 10 minutes, then
1000 p.s.i. for 10 minutes, then
2000 p.s.i. for 10 minutes, then
3000 p.s.i. for 10 minutes, then
4000 p.s.i. for 20 minutes or to the final desired thickness.

The gasket is held at 4000 p.s.i. while it is cooled in air to room temperature, and is then removed from the mold and trimmed at both its outer and inner diameters as required to remove flash and achieve the desired final diameters.

The resulting gasket exhibits superior dimensional stability, creep resistance, and structural uniformity in continuous service at 500° F. under 3000 p.s.i. pressure.

Examples 2 and 3

Two specimen gaskets were prepared in accordance with the procedure of Example 1. The first specimen had an average thickness of 0.169 inches, was approximately 0.2 inch wide, and had an outer diameter of 5.6 inches.

The second specimen had an average thickness of 0.0208 inch, was approximately 0.2 inch wide, and had an outer diameter of about 5.6 inches.

These specimens were both subjected to standard multi-seal testing procedures. Each gasket was inserted near the center of a stack of dummy seals, with dummy seals above and below the gasket. The rig was loaded to 1500 p.s.i., heated in an oven at 500° F. for 5 hours, cooled to room temperature and then checked for leaks by a standard bubble test.

In this test, the entire rig containing the gasket was submerged in water and gas pressurized with nitrogen. Any gas leakage through the seal would have produced bubbles in the water and thus provided a visible means of detecting a failure of the gasket. Both gaskets comprising Examples 2 and 3 successfully sealed 15 p.s.i. of nitrogen gas pressure.

These gasket specimens, produced in accordance with Example 1, were then subjected to an additional 65 hours of service at a temperature of 500° F. and an average pressure of 1400 p.s.i. These two specimen gaskets showed an average thinning during this test period of less than one-half of the thinning which occurred in control gaskets cut from PTFE sheets in a conventional manner and subjected to the same test conditions.

Additional gasket specimens produced in accordance with Example 1 were shelf stored for one year to test their dimensional stability under storage conditions. These gaskets showed no measurable shrinkage in diameter, and were flat and undistorted under their own weight after one year.

Example 4

In this example, the procedure of Example 1 was followed, except that: (1) in the compacting step the PTFE filaments were compressed to about 96% of the theoretical density of solid PTFE; (2) the compacting step was carried out at 200° F.; (3) the sintering step was carried out at 650° F. and 25 p.s.i. for 10 minutes; and (4) the cooling step was carried out by increasing the pressure to 3000 p.s.i. while concurrently cooling the gasket to 250° F. in approximately 5 minutes. No post-production working was used in this example.

After shelf storage for 300 hours, the product of this example was examined for shrinkage and out-of-roundness. It exhibited excellent dimensional stability and structural uniformity.

The products of this invention are superior in their stability and uniformity to any similar products that have been produced in the past. This improved product performance is exhibited under all use conditions, but particularly at elevated temperatures of about 400° F. or greater. Even greater superiority is exhibited by the gaskets of this invention when they are subjected in use to temperatures of about 500° F. or greater.

In addition to the superior products resulting from the process of this invention, this process provides substantial cost advantages over those previously used. It eliminates completely the requirement for post-production working and machining of the gaskets, although some post-production working can be used optionally to provide even further enhanced properties in the products of this invention. The foregoing benefits are believed to result from the method in which the products of this invention are produced, and particularly from the use of PTFE filaments (rather than powder or sheets) in the production of the instant gaskets. The use of such filaments allows the production of a product having uniform density, as well as good dimensional stability and corrosion resistance, low creep, and good structural uniformity.

We claim:

1. A process for producing a PTFE gasket having uniform density, good dimensional stability, good corrosion resistance and structural uniformity, and low creep, which process comprises the steps of: introducing a multiplicity of PTFE filaments into a mold with said filaments being arranged in substantially parallel relation to each other, compacting the PTFE filaments to reduce the interstices between them, sintering the filaments at an elevated temperature to bond them into a monolithic gasket unit, and cooling the gasket unit at a predetermined rate to produce a desired degree of crystallinity in the gasket.

2. The process of claim 1 in which the PTFE filaments are introduced into the mold by winding, and during the sintering step, the filaments are subjected to an elevated pressure.

3. The process of claim 2 in which the filaments are compacted to at least about 80% of the theoretical density of solid PTFE.

4. The process of claim 3 in which the filaments are compacted to at least about 90% of the density of solid PTFE.

5. The process of claim 2 in which the sintering is carried out at a temperature of at least about 575° F. and a pressure of at least about 5 p.s.i.

6. The process of claim 2 in which, following the cooling step, the gasket is subjected to an elevated pressure, at an elevated temperature below the second order transition range of PTFE.

7. The process of claim 6 in which the pressure applied to the gasket following the cooling step is greater than the anticipated loads to which gasket is to be subjected in subsequent use.

References Cited

UNITED STATES PATENTS

| | | | |
|---|---|---|---|
| 2,229,982 | 1/1941 | Masur et al. | 264—137 |
| 2,939,178 | 6/1960 | Haroldson et al. | 264—120 |
| 3,060,517 | 10/1962 | Fields | 264—120 |
| 3,186,897 | 6/1965 | Hochberg | 264—127 |

ROBERT F. WHITE, *Primary Examiner.*

J. R. HALL, *Assistant Examiner.*

U.S. Cl. X.R.

264—127